United States Patent
Nguyen

(10) Patent No.: US 6,839,055 B1
(45) Date of Patent: Jan. 4, 2005

(54) VIDEO DATA ERROR DETECTION

(75) Inventor: Khanh T. Nguyen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/491,071

(22) Filed: Jan. 25, 2000

(51) Int. Cl.[7] .................................................. G09G 5/00
(52) U.S. Cl. ....................... 345/204; 345/904; 348/192; 348/466; 714/43; 714/48; 714/746; 714/754
(58) Field of Search ................................. 345/204, 211, 345/212, 213, 904, 501, 520; 348/180, 181, 184, 185, 466, 189, 192; 714/4, 6, 25, 26, 27, 30, 31, 56, 57, 36, 43, 48, 735, 746, 754, 758, 799; 713/1, 2

(56) References Cited

U.S. PATENT DOCUMENTS

| | | | |
|---|---|---|---|
| 4,670,772 A | | 6/1987 | Bolger ......................... 358/11 |
| 4,680,599 A | | 7/1987 | Wertz et al. ................. 340/744 |
| 4,775,857 A | * | 10/1988 | Staggs ......................... 345/548 |
| 5,457,580 A | | 10/1995 | Yoo ........................... 360/36.2 |
| 5,491,791 A | * | 2/1996 | Glowny et al. ................ 714/26 |
| 5,512,961 A | * | 4/1996 | Cappels, Sr. ................. 348/173 |
| 5,594,736 A | | 1/1997 | Tatsumi et al. .............. 370/474 |

(List continued on next page.)

OTHER PUBLICATIONS

Darrell Hunt and Ronald Shaw; *Method And Apparatus For Counter Based Liquid Crystal Display Panel Identification For A Computer*; U.S. Appl. No.: 09/221,915; filed Dec. 28, 1998.

(List continued on next page.)

Primary Examiner—Henry N. Tran
(74) Attorney, Agent, or Firm—Baker Botts L.L.P.

(57) ABSTRACT

A system for providing an error indication of video data received from a first link of a data interface between a computer system video controller and a display system and for providing the error indication to the video controller from the display system via a second link of the data interface. Such a system can be utilized to determine if an error condition exits in the video data path between the video controller and display system. In one example, the data interface conforms to the Digital Visual Interface (DVI) specification. A diagnostic routine of an operating system can be utilized to generate a set of test video data and compare the generated error indication with a standard error indication to determined an error condition. Also, such a system allows a remote system to request a test of the video data path. In one embodiment, the error indication is provided to the video controller from the display system by inserting the error indication into a display information data structure such as, e.g., an Extended Display Identification Data (EDID) structure.

36 Claims, 4 Drawing Sheets

U.S. PATENT DOCUMENTS

| | | | | |
|---|---|---|---|---|
| 5,703,629 | A | | 12/1997 | Mermelstein et al. ........ 345/213 |
| 5,737,032 | A | | 4/1998 | Stenzel et al. ............... 348/649 |
| 5,778,139 | A | | 7/1998 | Kim ............................. 386/81 |
| 5,805,882 | A | * | 9/1998 | Cooper et al. ............... 711/166 |
| 5,875,202 | A | * | 2/1999 | Venters et al. .............. 714/807 |
| 5,943,092 | A | * | 8/1999 | Chuang et al. ............. 348/177 |
| 5,958,080 | A | * | 9/1999 | Kang ........................... 714/807 |
| 6,057,812 | A | * | 5/2000 | Arai et al. ..................... 345/10 |
| 6,057,860 | A | * | 5/2000 | Hoffert et al. ............... 345/501 |
| 6,089,459 | A | * | 7/2000 | Eisele et al. ................. 235/441 |
| 6,219,039 | B1 | * | 4/2001 | Chang et al. ................ 324/407 |
| 6,219,451 | B1 | * | 4/2001 | Hunt et al. ................... 345/3.1 |
| 6,281,929 | B1 | * | 8/2001 | Fimoff ......................... 348/180 |
| 6,323,828 | B1 | * | 11/2001 | Perez ........................... 345/10 |
| 6,337,682 | B1 | * | 1/2002 | Hwang ......................... 327/39 |
| 6,400,377 | B1 | * | 6/2002 | Hiraka et al. ................ 345/716 |
| 6,513,088 | B2 | * | 1/2003 | Arai et al. ................... 710/305 |
| 2001/0050679 | A1 | * | 12/2001 | Shigeta ........................ 345/204 |
| 2002/0000995 | A1 | * | 1/2002 | Sawada et al. ............. 345/620 |

OTHER PUBLICATIONS

Jack Joseph; *Multimedia Monitor Testing Apparatus And Method*; U.S. Appl. No.:09/181,489; filed Oct. 28,1998.

Luke Chang and Collin Cooke; *A Compact PC Video Subsystem Tester*; U.S. Appl. No.:09/237,770; filed Jan. 26, 1999.

Luke L. Chang and Joe E. Goodart; *Dual–Input Monitor Identification Scheme*; U.S. Appl. No. 09/491,072; filed Jan. 25, 2000.

Digital Display Working Group; *Digital Visual Interface DVI: Revision 1.0*; Apr. 2, 1999; 76 pages.

VESA®; Extended Display Identification Data (EDID™) Standard: Version 3; Nov. 13, 1997; 80 pages.

* cited by examiner

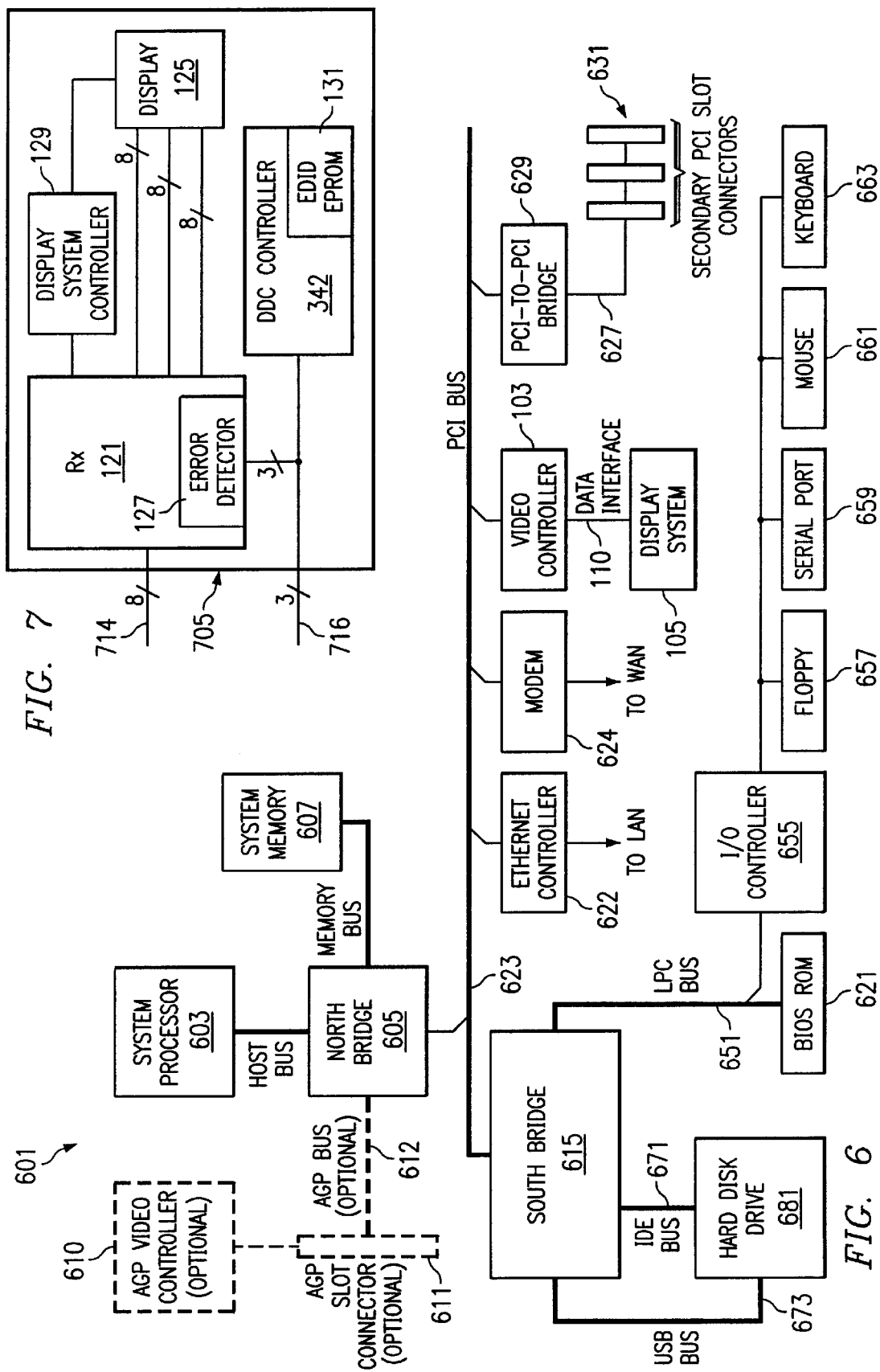

VIDEO DATA ERROR DETECTION

BACKGROUND

1. Field of the Invention

A computer system including a system for providing an error indication of video data.

2. Description of the Related Art

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and peripheral devices that provide input and output for the system. Such peripheral devices may include displays, keyboards, mouse-type input devices, floppy and hard disk drives, CD-ROM drives, printers, network access circuits, terminal devices, modems, televisions, sound devices, voice recognition devices, electronic pen devices, and mass storage devices such as tape drives, CD-R drives, or DVDs.

Testing of computer components is typically performed during the manufacture of a computer system and during troubleshooting of the computer system. One method of testing the video path between a video controller and display is to program the computer to display a test image or images and to manually evaluate the images displayed to determine whether the components of a computer system are operating and/or properly coupled. What is needed is an improved technique for testing a video data path.

SUMMARY

It has been discovered that generating error indications of video data transmitted from a video controller to a display system via a first link of an interface and providing those error indications back to the video controller via a second link of the interface advantageously provide a computer system with the ability to test the integrity of its video data path to a display system.

Another aspect, a computer system includes a system processor, a system memory operably coupled to the system processor, a video controller, a display system, and a data interface. The video controller is operably coupled to the display system via the data interface. The data interface includes a first link and a second link. The display system further includes a display for displaying images as per video data received via the first link and an error detection circuit for providing an error indication of video data received via the first link. The display system further includes an interface circuit for providing the error indication to the video controller via the second link.

In another aspect includes a method for determining an error in the transmission of video data along a video data path that includes a video controller of a computer system and a data interface that operably couples the video controller to a display system of the computer system. The method includes providing a set of video data from the video controller to the display system via a first link of the data interface. The method also includes generating an error indication of the set of video data and providing the error indication to the video controller via a second link of the data interface.

In another aspect, a computer system includes a system processor, a system memory operably coupled to the system processor, a video controller, a display system, and a data interface. The video controller is operably coupled to the display system via the data interface. The data interface includes a first link and a second link. The display system includes a display for displaying images as per video data received from the first link and means for providing an error indication of video data received via the first link to the video controller via the second link.

BRIEF DESCRIPTION OF THE DRAWINGS

FIG. 6 is a block diagram of an example of a computer system.

FIG. 7 is a block diagram of another example of a display system

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
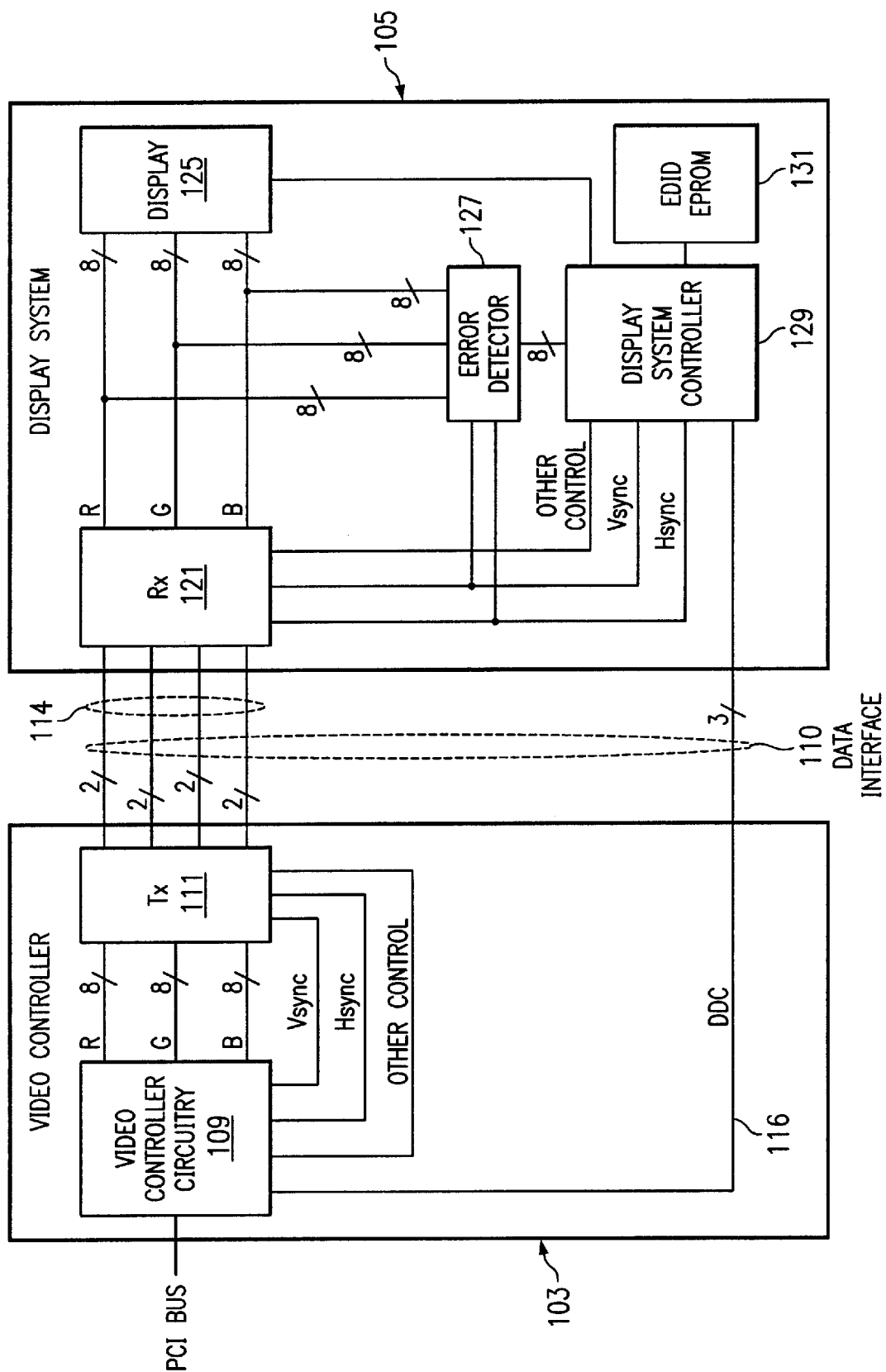
FIG. 1 is a block diagram of an example of a video controller and display system for a computer system.

FIG. 1 is an example of a computer system video controller and display system that are operably coupled together via a data interface. Video controller 103 includes video controller circuitry 109 that converts video data received from a computer system (e.g., 601 in FIG. 6) via a computer bus (e.g., a PCI computer bus or a computer bus conforming to the Advanced Graphics Port (AGP) standard) and formats the video data as per a computer video standard such as, e.g., the Video Graphic Array (VGA) standard. Video controller circuitry 109 also includes computer bus interface circuitry for operably coupling video controller 103 to the computer bus as well as controller circuitry for controlling the operations of video controller 103. An example of a video controller is GEFORCE PLUS video controller sold by NVIDIA.

Display system 105 includes a display 125 for displaying images as per the video data received from video controller 103. In one embodiment, display 125 is a flat panel display located in the lid portion of a portable computer system. However, other types of displays may be utilized such as, e.g., a CRT display. Display system 105 also includes a display system controller 129 for controlling the operation of display system 105. In the embodiment shown, display system controller 129 receives control signals (Vsync, Hsync, and other control signals) and controls the displaying of the color data (red, green, and blue pixel data) on display 125 as per the control signals.

Video controller 103 is operably coupled to display system 105 via a data interface 110. Data interface includes two links (114 and 116). In embodiment shown, link 114 includes four, 2-wire digital data channels for providing video data from video controller 103 to display system 105. Transmitter (Tx) 111 encodes three 8-bit parallel color data signals and control signals (Vsync, Hsync, and other control signals) into four channel signals transmitted to display system 105 via the four, 2-wire channels. Each 8 bit color data signal includes the level values for a red, green, or blue component of a pixel. In one embodiment, the video data is encoded to implement a single-link, transition minimized differential signaling (T.M.D.S.) architecture as per the Digital Visual Interface (DVI) specification, Rev. 1.0., Apr. 2, 1999. With other systems, the video data may be encoded to implement a dual link T.M.D.S. architecture as per the DVI specification or encoded as per other data transmission standards or protocols.

Display system 105 includes a receiver (Rx) circuit 121 that decodes the encoded color data and control signals. Display system 105 also includes an error detector for providing an error indication of the decoded color data. In one embodiment, error detector 127 is implemented with a programmable array logic (PAL) circuit. Error detector 127 includes 24 input terminals with each input terminal electrically connected to a color data output terminal of receiver circuit 121. Error detector 127 also includes inputs for receiving the Hsync and Vsync signals from receiver circuit 121. Error detector 127 includes 8 output terminals for providing an eight bit error indication of the 24 bit color data.

In one embodiment, error detector 127 is configured to provide an 8-bit checksum of the 24 bits of color data. With other systems, other types of error indications may be generated from the video data such as a parity checksum, a cyclic redundancy checksum, or a checksum from modulo addition. Also with other systems, the error indication may be generated from other groupings of video data. For example, an error indication may be generated from only half of the color bits (e.g., detector 127 would include 12 input terminals, one coupled to every other output of receiver circuit 121). With other systems, the error detector includes a memory for storing multiple pixel values wherein the error indication is generated over the multiple pixel values such as e.g. a line of pixels or a frame of pixels.

In the embodiment shown, controller 129 also includes interface circuitry for allowing display system 105 to exchange information with video controller 103 via a second link 116 of data interface 110. Controller 129 provides the error indication to video controller circuitry 109 via link 116. In the embodiment shown, link 116 is a 3-wire digital channel conforming to the Video Electronics Standards Association (VESA) Display Data Channel (DDC) Standard, Version 3. In one embodiment, information is exchanged via DDC link 116 utilizing a protocol based upon the I²C serial computer bus standard. With other systems, link 116 may conform to other standards such as, e.g., other VESA standards or other data transmission standards or protocols.

In one embodiment, controller 129 transmits the error indication to video controller circuitry 109 with display system information regarding display system 105. The display system information is transmitted to video controller circuitry 109 in an Extended Display Identification Data (EDID) structure. In one embodiment, the EDID structure is at least 128 bytes long and contains information regarding display system 105 such as vendor/product information, EDID structure version, basic display parameters/features, color characteristics, and timing information. The EDID structure is initially stored in EDID EPROM 131. Controller 129 accesses EDID EPROM 131 to obtain the EDID structure to provide the information to video controller circuitry 109. In one embodiment, the EDID structure conforms to the VESA EDID Standard, Version 3, November 1997. Controller 129 provides the EDID structure to video controller circuitry 109 during a startup sequence of display system 105 or in response to a request from video control circuitry 109 during startup.

In one embodiment, controller 129 places the error indication (e.g., a checksum) from error detector 127 in the "week of manufacture" field (10 h) or the "year of manufacture" field (11 h) of the EDID structure. With other systems, the error indication is placed in optional extension blocks at the end of the EDID structure as indicated by the extension flag byte field (7Eh).

Figure 2:
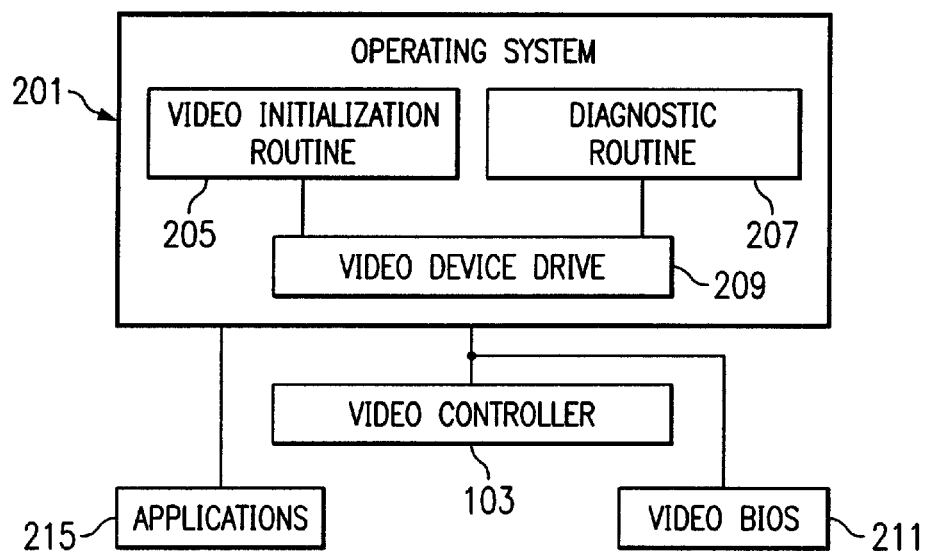
FIG. 2 is a software architecture block diagram of an example of a software architecture for a computer system.

FIG. 2 is an example of a software architecture for a computer system. Operating system 201 is implemented with operating system code executed by a system processor (e.g., 603 in FIG. 6) of a computer system. An example of an operating system is WINDOWS 98™ operating system available from Microsoft Corporation. Operating system 201 includes a video device driver 209 for performing interface operations with video controller 103. In performing interface operations, device driver 209 accesses video BIOS 211. Video device driver 209 provides video data to video controller 103 for display on display 125. Video data can be generated e.g., by applications 215 (application code executed by the system processor) or by other routines of operating system 201. Operating system 201 also includes a video initialization routine 205 that performs operations during the startup of the computer system. Video initialization routine 205 implements the information received in the EDID structure during the startup of the computer system.

Operating system 201 also includes a diagnostic routine 207 that tests the integrity of the video data path from video control circuitry 109 to receiver 121 of display system 105. In one example, to test the integrity of the video path, diagnostic routine 207 places display system 105 in a diagnostic mode via signals sent to controller 129 through DDC link 116. Diagnostic routine 207 then commands video controller circuitry 109 to provide a set of video test data generated by diagnostic routine 207 to display system 105 via link 114. After receiver circuit 121 decodes the test video data, error detector 127 generates a checksum of the color data of the test data and display system controller 129 inserts the checksum into a field of the EDID structure retrieved from EDID EPROM 131. Controller 129 then provides the data structure to video control circuitry 109 via DDC link 116. Diagnostic routine 207 then compares the checksum received via DDC link 116 with a standard checksum. An error condition is determined to exist in the video data path if the received checksum does not match the standard checksum. If an error condition is determined to exist, an error message to that effect is displayed on display 125 (if operable). With some systems, the diagnostic routine is a part of the video initialization routine 205.

Examples of video test data include a set of random pixel data, a set of alternating black and white pixels, and a frame of alternating black and white lines.

In some embodiments, diagnostic routine 207 places display system 105 in a diagnostic mode by sending a specific sequence of signals via link 114 that is highly unlikely to be sent during a normal operation of a computer system. An example of such a sequence includes 1) sending a video frame with a checksum of 8, 2) sending a second video frame with a checksum of 3, 3) sending a third video frame with a checksum of 2, and 4) immediately following the third video frame, placing the display system into an intermediate power state. In one embodiment, display system 105 is placed in an intermediate power state by deactivating transmitter 111. When controller 129 determines that such a sequence has been sent, it places display system 105 in a diagnostic mode. With display system 105 in a diagnostic mode, diagnostic routine 207 sends the set of test data wherein controller 129 inserts at least one checksum (or other type of error indication) into an EDID structure and provides the data structure to video control circuitry 109. After the test is complete, diagnostic routine 207 sends the same sequence to place display system 105 in a non diagnostic mode.

In another embodiment, diagnostic routine 207 sends the set of test data and immediately afterwards places display system 105 in an intermediate power state by deactivating transmitter 111. In response to display system 105 being placed in an intermediate power state, controller 129 places the error indication into an EDID structure and provides the data structure to video control circuitry 109. Because most video initialization routines do not expect a valid EDID structure when the display system is in an intermediate power state, the entire EDID block may be utilized for error indication information.

One advantage of a routine such as routine 207 is that it allows for the video controller 103, data interface 110, and receiver 121 to be tested without having to rely on a manual inspection of a displayed image. Furthermore, when routine 207 is implemented with a manual inspection, routine 207 can indicate to a tester whether a faulty image on display 125 is due to a problem with display 125 or due to a problem with video controller 103, data interface 110, or receiver circuit 121.

Referring back to FIG. 1, with other systems, error detector 127 and/or EDID EPROM 131 (or other non volatile memory) are implemented in an integrated circuit with display system controller 129. Also with other embodiments, display system controller 129 provides the error indication separately from the EDID structure either in response to a request received from DDC link 116 or after a predetermined period of time from receiving the test video data. In some embodiments, the error indication is provided separately in a data structure that is similar to an EDID structure.

Figure 3:
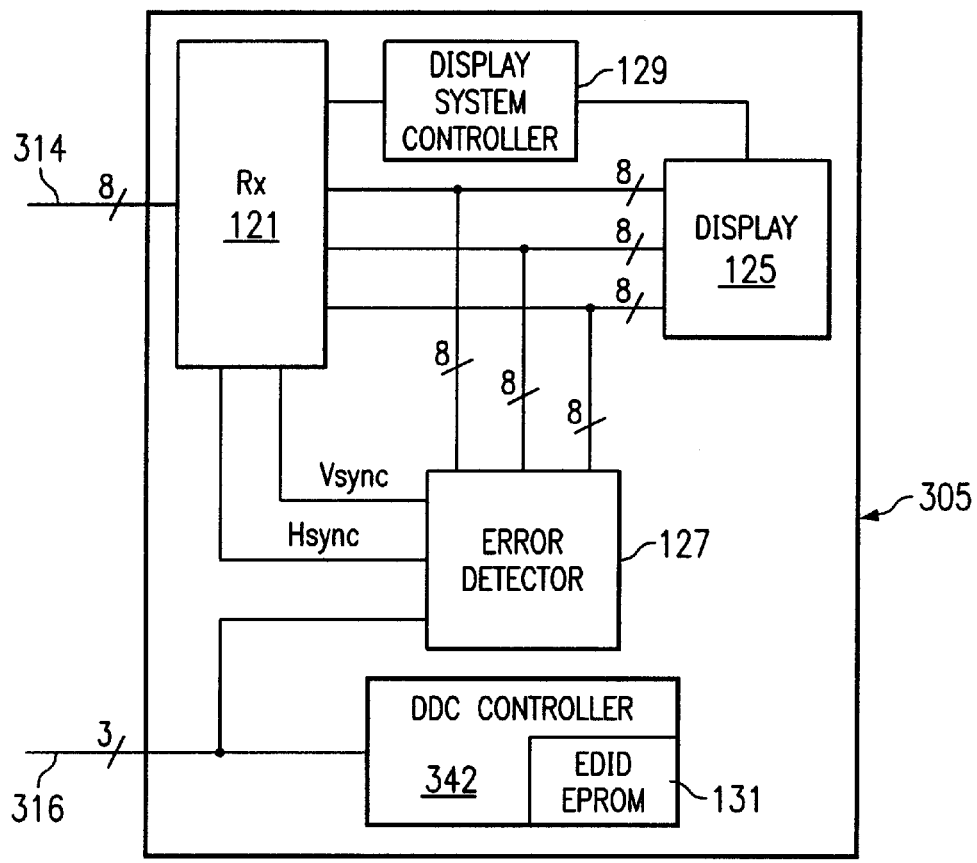
FIG. 3 is a block diagram of another example of a display system.

FIG. 3 shows another example of a display system. Display system 305 includes a display 125, a display system controller 129, and a receiver 121 for receiving video data from a video controller via DDC link 314. Display system 305 also includes a DDC controller 342 with integrated EDID EPROM 131. DDC controller 342 includes DDC link interface circuitry to provide the EDID structure to a video controller (not shown in FIG. 3) via DDC link 316.

Display system 305 includes an error detector 127 for generating an error indication (e.g., a checksum) of the color data. Error detector 127 also includes link interface circuitry for monitoring link 316 to determine when DDC controller 342 is providing the EDID structure and for tacking the checksum onto the EDID structure. With other circuits, the DDC controller 342 and display system controller 129 are implemented in an integrated circuit.

In other embodiments; error detector 127 provides the error indication at a separate time from when DDC controller 342 provides the EDID structure. With these embodiments, error detector 127 monitors the output of DDC controller 342 so as to avoid simultaneously transmitting with DDC controller 342. With other embodiments, error detector 127 has a separate DDC link address from DDC controller 342. In these embodiments, the video controller circuitry (e.g., 109) would separately poll error detector 127 and DDC controller 342 to obtain the information at different times. With some of these embodiments, error detector 127 continuously calculates an error indication of video data received. Consequently, because error detector 127 provides error indication data separately from DDC controller 342, diagnostic routine 207 does not have to place display system 305 in a diagnostic mode in order to receive the error indications.

Figure 4:
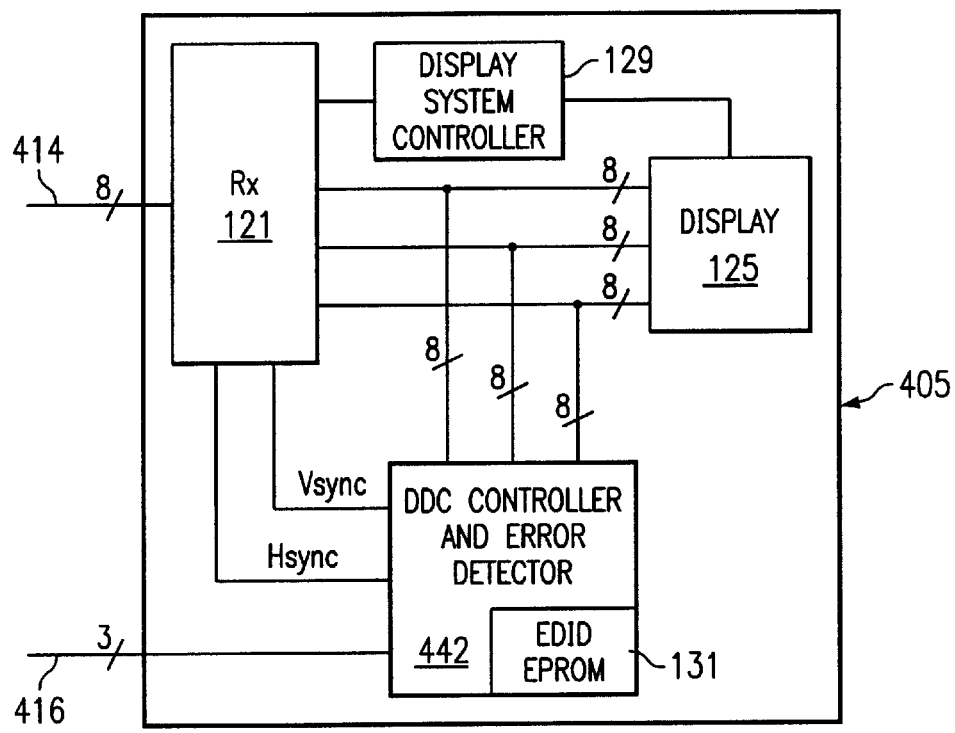
FIG. 4 is a block diagram of another example of a display system.

FIG. 4 shows another example of a display system wherein the error detection circuitry and EDID circuitry are implemented in an integrated circuit. Display system 405 includes a display 125, a display system controller 129, and a receiver 121 for receiving video data from a video controller via link 414. Integrated circuit 442 includes error detector circuitry for generating an error indication, an EDID EPROM 442 for storing an EDID structure, circuitry for inserting the error indication into a field of the EDID structure, and DDC link circuitry for providing and receiving information to and from a video controller (not shown in FIG. 4) via DDC link 416.

Figure 5:
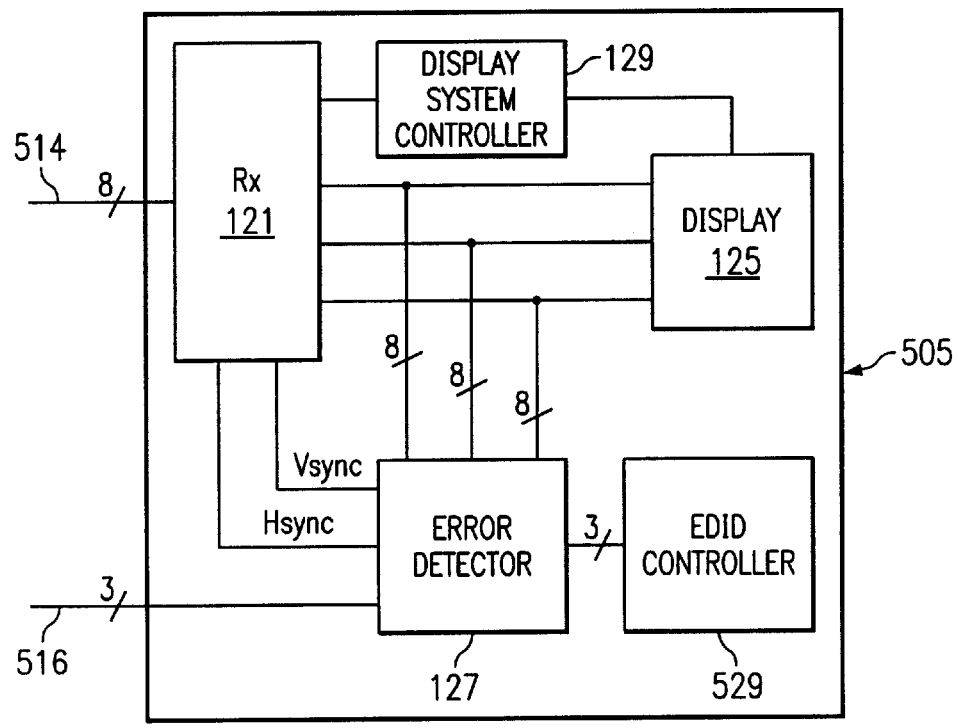
FIG. 5 is a block diagram of another example of a display system.

FIG. 5 shows another example of a display system wherein the error detection circuitry is operably coupled to the EDID circuitry via a link having a protocol similar to the protocol of the link between the error detection circuit and the video controller. Display system 505 includes a display 125, a display system controller 129, and a receiver 121 for receiving video data from a video controller via link 514. Error detector 127 includes circuitry for generating an error indication from the color data received from receiver 121 and DDC link interface circuitry. EDID controller 529 includes a non volatile memory for storing the EDID structure and interface circuitry for communicating with error detector 127 as per protocol of the DDC Standard. In one embodiment, when display system 505 is placed in a diagnostic mode, error detector 127 generates an error indication of the color data from receiver 121 and inserts the error indication into an EDID structure received from the EDID controller 529. When display system 505 is placed in a non diagnostic mode, error detector 127 transitions to a pass through mode where EDID controller 529 provides the EDID structure to DDC link 516 via error detector 127.

FIG. 7 shows another example of a display system wherein the error detection circuitry is integrated with the receiver circuitry. Display system 705 includes a display 125, a display system controller 129, and a receiver 121 for receiving video data from a video controller via link 714. Display system 705 also includes a DDC controller 342 with integrated EDID EPROM 131. DDC controller 342 includes DDC link interface circuitry to provide the EDID structure to a video controller (not shown in FIG. 3) via DDC link 716.

Display system 705 includes an error detector 127 for generating an error indication (e.g., a checksum) of the color data. Error detector 127 is integrated with receiver 121. Integrating the error detection circuitry with the receiver circuitry advantageously eliminates input terminals of a chip required for an error detection circuit. In the embodiment shown, error detector 127 also includes link interface circuitry for providing the error indication to a video controller via link 716. With some circuits, the error detection circuitry integrated with receiver 121 provides the error indication to DDC controller 342 to provide to a video controller via link 716.

FIG. 6 is a block diagram of an example of a computer system. Computer system 601 includes a system processor 603 and a system memory 607 operably coupled to system processor 603 via a Memory Bus, a north bridge circuit 605, and a Host Bus. An example of a system processor is the PENTIUM III processor sold by INTEL™. In one embodiment, north bridge circuit 605 is implemented with the RCC 3.0LE, SERVERSET III chipset sold by the RELIANCE COMPUTER CORPORATION™.

Computer system 601 includes a number of computer busses conforming to various computer bus standards that enable system processor 603 to be operably coupled to multiple computer components. Computer bus 623 conforms to the Peripheral Component Interface (PCI) local bus specification, rev. 2.2. Computer bus 623 is operably coupled to system processor 603 via north bridge circuit 605. Located on PCI computer bus 623 are video controller 103, ethernet controller 622, and modem 624, all of which are mounted on a system board (not shown). Display system 105 is operably coupled to video controller 103 via data interface 110. Computer system 601 also includes a secondary PCI computer bus 627 operably coupled to computer bus 623 via a PCI-to-PCI bridge 629. Slot connectors 631 are located on secondary bus 627.

Ethernet controller 622 allows computer system 601 to be operably coupled to a Local Area Network (LAN) to exchange information with other remote computer systems via the LAN. Modem 624 allows computer system 601 to be operably coupled to a Wide Area Network (WAN) (e.g., the internet) to exchange information with other remote computer systems via the WAN.

Ethernet controller 622 and modem 624 allow computer system 601 to receive remote computer system generated requests to invoke diagnostic routine 207 to test the integrity of the video data path between video controller 103 and display system 105. For example, such a request can be made from a remote computer system of a system administrator (via a LAN network) or a computer system of a customer service representative (via the internet). If a user is having problems with the display, the remote computer system can provide a request to invoke diagnostic routine 207 to determine if there is a problem with video controller 103, data interface 110, or receiver 121. The remote computer system is then provided with a indication of the results as determined by diagnostic routine 207. With some systems, the remote data system would provide the test video data set to computer system 601 to be displayed on display 125. The remote computer system would receive the checksum or other generated error indication and compare the received error indication with a standard indication to determine if there is an error condition.

A video controller may be operably coupled to a computer system via other computer busses and/or conform to other video controller standards. For example, the location of a video controller 610 conforming to the Advanced Graphics Port (AGP) Specification is shown in dashed lines in FIG. 6 operably coupled to north bridge 605 via an AGP slot connector 611 and AGP bus 612. With other computer systems, video controller 103 is implemented on an add-in card inserted into a PCI slot connector of connectors 631.

South bridge circuit 615 is located on PCI bus 623. In one embodiment, south bridge circuit 615 is implemented with an OSB4 chipset sold by the RELIANCE COMPUTER CORPORATION™. Other computer components (not shown) may also be operably coupled to PCI busses 623 and 627 including components (not shown) located on computer cards inserted into card slot connectors 631.

Computer system 601 also includes computer bus 651 which conforms to the Low Pin Count (LPC) bus standard. LPC computer bus 651 is operably coupled to system processor 603 via south bridge circuit 615. Operably coupled to LPC computer bus 651 are BIOS ROM 621 and I/O controller 655. BIOS ROM 621 stores system BIOS code. Operably coupled to I/O controller 655 are floppy disk drive 657, serial port 659, mouse 661, and keyboard 663. A hard disk drive 681 is operably coupled to IDE computer bus 671. Hard disk drive 681 stores application and operating system code such as code for operating system 201 and applications 215. Computer system 601 also includes a computer bus 673 conforming to the Universal Serial Bus (USB) standard. Other conventional computer components (not shown) may be coupled via the computer busses and maybe located either on computer cards or mounted to a system board of computer system 601.

Those of skill in the art will recognize that, based upon the teachings herein, several modifications may be made to the embodiments shown in FIGS. 1–7. For example, providing an error indication of the test video data may be utilized in other forms and/or versions of computer systems.

Also, in some embodiments, an error indication of video data may be continuously generated and provided to the video controller via the DDC link (or link conforming to another protocol). In one example, a video controller (e.g., 103) would also include an identical error detection circuit to generate the same type of error indication as the error detector 127 located in the display system. The video controller error detection circuit would generate an error indication of the video data to be sent to the display system. The video controller would also include circuitry that would compare the two error indications and would signal an error condition if the two error indications did not match.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A computer system with an all-digital display system, the display system having on-board testing of digital display data, comprising:

a system processor;

a system memory operably coupled to the system processor;

a video controller;

a digital display system;

a data interface, operable to couple the video controller directly to the digital display system, the data interface including a first link for delivering digital display data to the digital display system and a second link that substantially conforms to the Display Data Channel standard;

wherein the digital display system has at least:

a receiver for receiving the digital display data directly from the video controller via the first link;

a display for displaying images as per the digital display data received via the first link;

an error detection circuit for receiving the digital display data directly intercepted from a data path from the receiver to the display, and for generating a checksum from the digital display data, thereby providing an error indication of the digital display data; and an interface circuit for providing the error indication to the video controller via the second link.

2. The computer system of claim 1 wherein the display system further has a non volatile memory for storing at least a portion of a display information data structure, the interface circuit providing the error indication information within or as an extension of the at least a portion of the data structure.

3. The computer system of claim 2 wherein the interface circuit and the non volatile memory are implemented in an integrated circuit.

4. The computer system of claim 1 wherein the error detection circuit and the interface circuit are implemented in an integrated circuit.

5. The computer system of claim 1, wherein the error detector operates on test digital display data.

6. The computer system of claim 1 further comprising a non volatile memory for storing code whose execution by the system processor provides a test video data set to the display system via the first link.

7. The computer system of claim 6 wherein the non volatile memory stores code whose execution by the system processor compares the error indication of the test video data set with a standard indication to determine an error condition.

8. The computer system of claim 6 further comprising:
a network access circuit for receiving information from a remote system over a network;
wherein execution of the code stored in the non volatile memory provides the test video data set to the display system in response to receiving a request from a remote system via the network access circuit.

9. The computer system of claim 1 wherein the data interface substantially conforms to a standard based upon a Digital Visual Interface (DVI) standard.

10. The computer system of claim 1 wherein the display is a flat panel display.

11. The computer system of claim 1, wherein the checksum is one of the following types of checksums: cyclic redundancy checksum, parity checksum, or checksum from modulo addition.

12. The computer system of claim 1, wherein the error detector operates on actual digital display data.

13. The computer system of claim 1 wherein the display system further includes:
a non volatile memory for storing a display information data structure;
a second interface circuit coupled to the non volatile memory for providing the data structure to the video controller via the second link;
the interface circuit, when operating in a diagnostic mode, monitoring an output of the second interface circuit and tacking the error indication to the information data structure provided to the video controller via the second link.

14. The computer system of claim 1 wherein the error indication represents a checksum of the video data.

15. The computer system of claim 1 wherein the display system operates in a diagnostic mode and a non diagnostic mode, in a diagnostic mode, the interface circuit provides the error indication to the video controller via the second link, in a non diagnostic mode, the interface circuit does not provide the error indication to the video controller.

16. The computer system of claim 1 wherein the display system further includes:
a receiver circuit having input terminals electrically coupled to data lines of the data interface and a plurality of output terminals for providing video data to the display;
wherein the error detection circuit includes a plurality of input terminals, each electrically coupled to an output terminal of the receiver circuit.

17. The computer system of claim 1 wherein the display system further includes:
a receiver circuit having input terminals electrically coupled to data lines of the data interface and a plurality of output terminals for providing video data to the display;
wherein the receiver circuit and the error detection circuit are implemented in an integrated circuit.

18. The computer system of claim 1 wherein the display system includes a display system controller, and wherein the display system controller and the interface circuit are implemented in an integrated circuit.

19. The computer system of claim 1 wherein the digital display data includes pixel color data, and wherein the error detection circuit provides an error indication of the pixel color data.

20. The computer system of claim 1 wherein the digital display data transmitted on the first link is encoded to implement a transition minimized differential signaling (T.M.D.S.) architecture.

21. A method for determining an error in the transmission of digital display data along an all-digital video data path that includes a video controller of a computer system, a digital display system having a receiver and a display, and a data interface that couples the video controller to the digital display system, the method comprising the steps of:
providing a set of digital display data from the video controller directly to the digital display system via a first link of the data interface;
receiving the digital display data at the digital display system;
connecting an error detection circuit directly to the data path between the receiver and the display;
detecting error, using the error detection circuit, within the digital display data by generating a checksum from the digital display data;
generating an error indication based on the checksum;
providing the error indication to the video controller via a second link of the data interface;
wherein the receiving, connecting, detecting, generating, and providing steps are performed by circuitry of the digital display system; and
wherein the second link substantially conforms to the Display Data Channel standard.

22. The method of claim 21 wherein the step of generating an error indication is performed by generating a checksum of the set of video data.

23. The method of claim 21 wherein the step of providing the error indication to video controller further includes sending the error indication with a display information data structure.

24. The method of claim 23 wherein the step of sending the error indication with display information data structure further includes:
monitoring an interface circuit that sends the display information data structure; and
tacking the error indication to the display information data structure as an extension.

25. The method of claim 23 wherein the step of sending the error indication with the display information further includes inserting the error indication into a field of the data structure.

26. The method of claim 21 further comprising the step of placing the video display in a diagnostic mode prior to providing the digital display data.

27. The method of claim 21 further comprising the step of receiving a remote request, wherein the digital display data is provided in response to receiving the request.

28. The method of claim 27 further comprising the steps of determining from the error indication whether an error condition exists; and providing an indication of the determination to a computer system from which the remote request was received.

29. The method of claim 21 further comprising the step of comparing the error indication with a standard indication to determine an existence of an error condition.

30. The method claim 21 wherein the generating step a further includes performing modulo addition on the video data.

31. The method of claim 21 wherein:
the digital display data includes color data; and
the generating step further includes generating the error indication from the color data.

32. An all-digital display system for displaying digital display data delivered from a computer having a video controller, and having on-board testing of the digital display data, the display system comprising:
a receiver for receiving digital display data directly from the video controller via a first link;
a digital display for displaying images corresponding to the digital display data;
an error detection circuit for receiving the digital display data, directly intercepted from a data path from the receiver to the digital display, operable to generate a checksum from the digital display data, thereby providing an error indication of the digital display data; and
an interface circuit operable to receive the checksum from the error detection circuit and to deliver the error indication to the video controller via a second link that substantially conforms to the Display Data Channel standard.

33. The digital display system of claim 32, further comprising memory for storing EDID data and wherein the interface circuit is further operable to embed the checksum in the EDID data.

34. The digital display system of claim 32, wherein the checksum is one of the following types of checksums: CRC, parity checksum, or checksum from modulo addition.

35. The digital display system of claim 32, herein the checksum is performed on all bits of the digital display data.

36. The digital display system of claim 32, wherein the checksum is performed on selected bits of the digital display data.

* * * * *